UNITED STATES PATENT OFFICE.

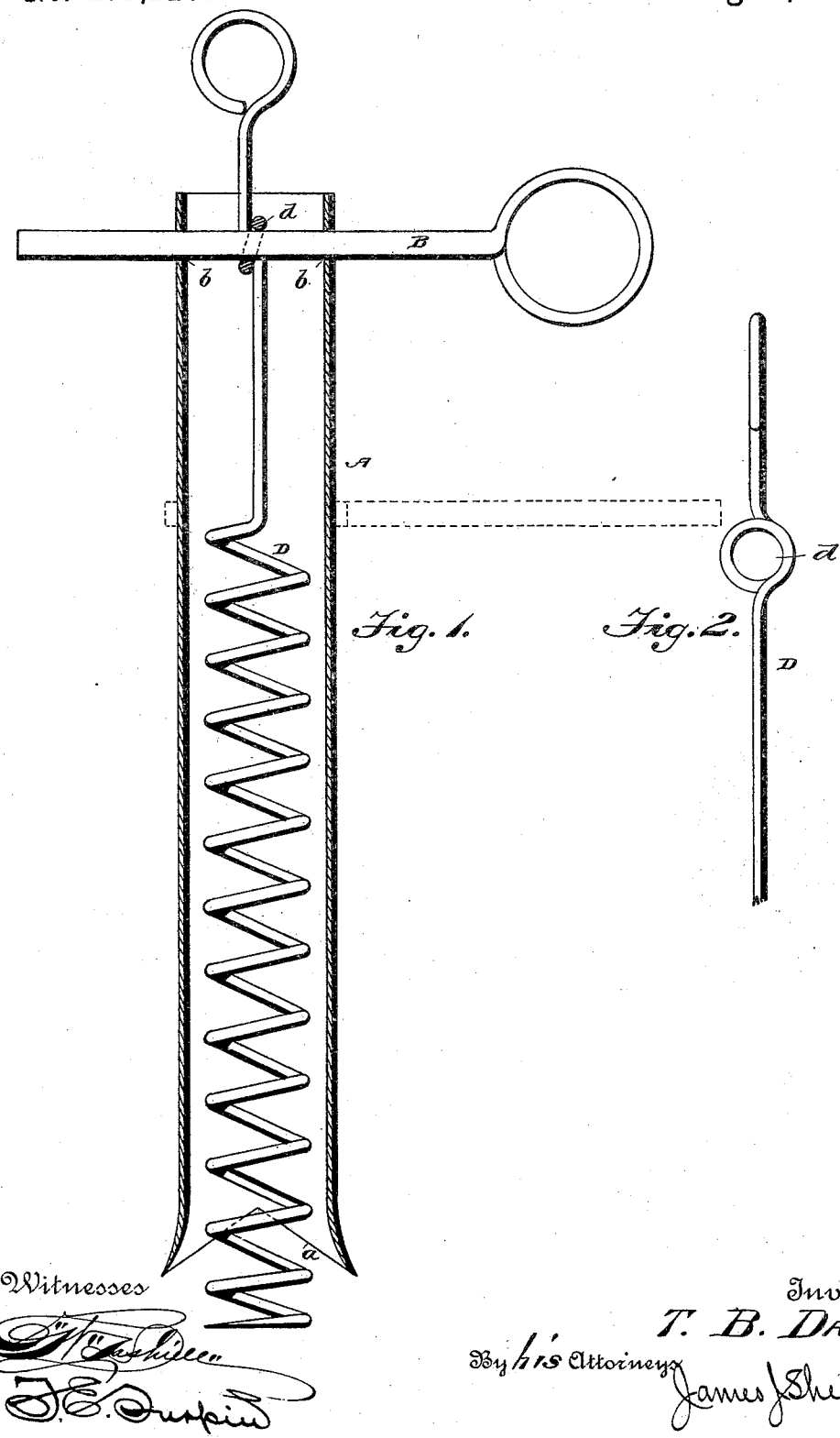

THOMAS B. DRAPER, OF RED OAK, IOWA.

DEVICE FOR SAMPLING HAY.

SPECIFICATION forming part of Letters Patent No. 408,223, dated August 6, 1889.

Application filed May 11, 1889. Serial No. 310,431. (No model.)

*To all whom it may concern:*

Be it known that I, THOMAS B. DRAPER, a citizen of the United States, residing at Red Oak, in the county of Montgomery and State of Iowa, have invented certain new and useful Improvements in Devices for Sampling Hay; and I do declare the following to be a full, clear, and exact description of the invention, such as will enable others skilled in the art to which it appertains to make and use the same.

This invention has relation to a device for sampling hay or other material and ventilating bales thereof, and the novelty will be fully understood from the following description and claims, when taken in connection with the annexed drawings, in which—

Figure 1 is a vertical longitudinal sectional view of my improved device, showing the auger or worm in elevation, the dotted lines illustrating the handle-bar in a position to stay the tube while the auger and core are being withdrawn. Fig. 2 is a view of a portion of the handle of the auger.

In carrying out my invention I take a tube of steel or other suitable material of a sufficient length and provided at one end with a cutting-edge, as shown at $a$, so as to adapt the said tube to be turned or forced into a bale or stack of hay, &c.

I do not wish to be understood as confining myself to any particular manner of forming the cutting-edge on the tube; but I prefer to form an edge such as shown, so that it may cut when the tube is turned in either direction or to the right or left. This tube should be open at opposite ends for the passage of an auger, which will be presently explained, and its adjacent or inner end is provided with a handle or other means for turning the same.

In the present illustration of my invention I have shown the upper or inner end of the tube provided with diametrically-arranged apertures $b$, to receive a round or cross-bar B, which is designed to serve as a handle, whereby the tube may be turned in operation, although it is obvious that any means might be employed for this purpose. This bar or rod B has an eye C turned on one end, which is adapted to pass over the tube A when the said tube has been inserted in the hay or other material and hold the same while the auger is being withdrawn with a core of hay.

D indicates the auger or worm, which may be of any suitable material and length, so that it may turn freely within the tube A. This auger is provided at its inner end with means for handling and withdrawing from the tube, and at a suitable point from the handle it is provided with an eye $d$, adapted to match the eyes or apertures $b$ in the tube A and receive the handle or key B, as shown.

It will be observed that the auger has its entering point extending slightly beyond the cutting end of the tube, so that in operation it may serve to draw the tube into the hay while being turned.

In operation, when it is desirable to sample a bale of hay, the auger is placed in the tube in the position shown in Fig. 1 of the drawings, and the pin or cross-bar arranged so as to fix the auger with respect to the tube. The handle portions are then grasped by the operator and turned, when the tube and auger may be carried into the hay to any desired point, after which the locking pin or bar B is removed and the eye portion passed down over the tube to or near the bale. The operator then places one knee or foot on the bar, so as to hold the tube steady while the auger with a core of hay is being withdrawn therefrom.

It is well known that hay, if baled too green or if damp when baled, will become impaired, but if allowed to cool throughout the body will be prevented from damage.

The cooling may be accomplished by my improved device, as it is obvious that by boring a number of holes in a bale a thorough ventilation may be had and the hay consequently cooled. When the tube has been inserted, the operator will find it convenient, by placing his foot upon the round or bar B, to firmly retain the tube in the bale while withdrawing the auger and core of hay or other material, the said bar thereby serving the functions of a holding device for the tube and a handle therefor, as well as a means for securing the auger in position within the tube.

It is not necessary that the auger should be placed in the tube while turning the latter into a bale of hay, as it is obvious that the tube may be turned into the hay when the auger has been removed.

While the tube is designed to serve as a casing for the auger and to cut the core of hay to be withdrawn, yet I do not wish to be understood as confining myself to any special form of tube, and in some cases a split tube partly opened may be used.

Having described my invention, what I claim is—

1. A hay sampling and ventilating device comprising a tube having one end provided with a cutting-edge and an auger adapted to enter said tube, substantially as specified.

2. The combination, with a tube having one end provided with a cutting-edge, of an auger adapted to enter said tube and suitable means for fixing the auger to the tube, substantially as specified.

3. The combination, with a tube having one end provided with a cutting-edge and its opposite end provided with diametrically-arranged apertures, of an auger adapted to enter said tube and having an eye or aperture adapted to coincide with those of the tube, and a key or pin adapted to enter the respective apertures, so as to fix the auger with respect to the tube, substantially as specified.

4. The combination, with a tube having one end provided with a cutting-edge and its opposite end provided with registering apertures, of an auger adapted to enter said tube and having an eye or aperture to coincide with those in the tube, and a round or pin passing through the respective apertures and extended from the tube to form handles, substantially as specified.

5. The combination, with the tube having one end provided with a cutting-edge and its opposite end provided with a removable handle or arm, of an auger adapted to enter said tube and be fixed by said handle, substantially as specified.

6. A hay-sampling device comprising a tube having one end provided with a cutting-edge, an auger arranged in said tube, and a round or rod having an eye at one end and adapted to serve the functions of removably fixing the auger in the tube, of serving as a handle, and of staying the tube while the auger and core are being withdrawn, substantially as specified.

7. A hay-sampling device comprising a tube having one end provided with a cutting-edge, an auger arranged in said tube, and a handle for removably fixing the auger in the tube, so as to have the entering point of the auger project slightly beyond the cutting-edge of the tube, substantially as specified.

In testimony whereof I affix my signature in presence of two witnesses.

THOMAS B. DRAPER.

Witnesses:
W. D. BUSTEED,
F. A. CHAPMAN.